(12) United States Patent
Holland et al.

(10) Patent No.: US 8,790,608 B2
(45) Date of Patent: Jul. 29, 2014

(54) SILICEOUS MATERIALS HAVING TUNABLE POROSITY AND SURFACE MORPHOLOGY AND METHODS OF SYNTHESIZING SAME

(75) Inventors: Brian T. Holland, Madison, WI (US); Sascha Welz, Chicago, IL (US)

(73) Assignee: Nalco Company, Naperville, IL (US)

(*) Notice: Subject to any disclaimer, the term of this patent is extended or adjusted under 35 U.S.C. 154(b) by 0 days.

(21) Appl. No.: 12/209,790

(22) Filed: Sep. 12, 2008

(65) Prior Publication Data

US 2010/0068519 A1  Mar. 18, 2010

(51) Int. Cl.
*C01B 33/00* (2006.01)
*C01B 33/12* (2006.01)

(52) U.S. Cl.
USPC ............ 423/324; 423/1; 423/22; 423/23; 423/53; 423/102; 423/124; 423/142; 423/335; 423/339; 428/402; 428/403

(58) Field of Classification Search
USPC ........... 428/402–407; 427/212; 423/1, 22, 23, 423/43, 53, 102, 124, 142, 324, 335, 339
See application file for complete search history.

(56) References Cited

U.S. PATENT DOCUMENTS

| | | | |
|---|---|---|---|
| 2,892,797 A | 6/1959 | Alexander et al. | |
| 2,913,419 A | 11/1959 | Alexander et al. | |
| 2,974,108 A | 3/1961 | Alexander et al. | |
| 3,442,795 A | 5/1969 | Kerr et al. | |
| 3,745,126 A | 7/1973 | Moore | |
| 3,864,142 A | 2/1975 | Kovarik | |
| 4,287,086 A | 9/1981 | Finlayson et al. | |
| 4,410,501 A | 10/1983 | Taramasso et al. | |
| 4,451,388 A | 5/1984 | Payne | |
| 5,221,497 A | 6/1993 | Watanabe et al. | |
| 5,558,851 A | 9/1996 | Miller | |
| 5,597,512 A * | 1/1997 | Watanabe et al. | ............... 516/34 |
| 6,191,323 B1 | 2/2001 | Nemeth et al. | |
| 6,306,364 B1 | 10/2001 | Valencia et al. | |
| 6,358,882 B1 | 3/2002 | Salem et al. | |
| 6,680,013 B1 * | 1/2004 | Stein et al. | ....................... 264/44 |

(Continued)

OTHER PUBLICATIONS

Breitscheidel, B. et al.,"Metal Complexes in Inorganic Matrices. Nanometer-Sized, Uniform Metal Particles in a SiO2 Matrix by Sol-Gel Processing of Metal Complexes." Chemistry of Materials, vol. 3, 1991, pp. 559-566.

(Continued)

*Primary Examiner* — D. S. Nakarani
(74) *Attorney, Agent, or Firm* — Edward O. Yonter (57) ABSTRACT

Non-spherical siliceous particles having a plurality of porous branches are disclosed and claimed. The porous branches are randomly oriented and elongated, ring-like, and/or aggregated. An additive introduced during synthesis of the particles modifies pore volume and morphology. The tunability of the pore volume includes an inner diameter ranging from about 2 Å to about 50,000 Å. Synthesizing the particles includes mixing under constant or intermittent stirring in a reaction vessel an aqueous silicic acid solution with an acidic heel solution to form a mixture. The stirring may optionally be performed at a variable speed. An additive is introduced into the mixture at a controlled rate, wherein the additive imposes a pH change from a lower pH to a higher pH to the mixture to induce siliceous particle precipitation. Optionally, a metal dopand may be introduced into the particles and/or at least a portion of an outer surface located outside of the pores and/or an inner surface located inside of the pores may be modified.

13 Claims, 10 Drawing Sheets

(56) References Cited

U.S. PATENT DOCUMENTS

2001/0034375 A1* 10/2001 Schwertfeger et al. .......... 516/98
2005/0014000 A1 1/2005 Bringley et al.
2007/0034116 A1 2/2007 MacDonald

OTHER PUBLICATIONS

Heinrichs, B. et al., "Pd/SiO2 Cogelled Aerogel Catalysts and Impregnated Aerogel and Xerogel Catalysts: Synthesis and Characterization," Journal of Catalysis, vol. 170, 1997, pp. 366-376.

Hermans, L. A. M.; Geus, J. W., Interaction of nickel ions with silica supports during deposition-precipitation, Studies in Surface Science and Catalysis, 1979, 3, 113-130.

Lambert, S et al., "Synthesis of PdISiO2, Ag/SiO2, and Cu/SiO2 cogelled xerogel catalysts: study of metal dispersion and catalytic activity," Journal of Catalysis, vol. 221, 2004, pp. 335-346.

Lopez, T. et al., "Pt/SiO2 Sol-Gel Catalysts: Effects of pH and Platinum Precursor," Journal of Physical Chemistry, vol. 97, 1993, pp. 1671-1677.

Mizukoshi, Y. et al., "Sonochemical Preparation of Bimetallic Nanoparticles of Gold/Palladium in Aqueous Solutions," Journal of Physical Chemistry B, vol. 101, No. 36, 1997, pp. 7033-7097.

Mörke, W. et al., "Metal Complexes in Inorganic Matrices. Composition of Highly Dispersed Bimetallic Ni, Pd Alloy Particles Prepared by Sol-Gel Processing: Electron Microscopy and Ferromagnetic Resonance Study," Chemistry of Materials, vol. 6, 1994, pp. 1659-1666.

Tanaka, S. et al., "Preparation of highly dispersed silica-supported palladium catalysts by a complexing agent-assisted sol-gel method and their characteristics," Applied Catalysis A: General, vol. 229, 2002, pp. 165-174.

Ueno, A. et al, "Particle-size Distribution of Nickel Dispersed on Silica and its Effects on Hydrogenation of Propionaldehyde," Journal of Chemical Society, Faraday Translation I, vol. 79, 1983, pp. 127-136.

Han, Y.; Wu, S.; Sun, Y.; Li, D.; Xiao, F.-S.; Liu, J.; Zhang, X., "Hydrothermally Stable Ordered Hexagonal Mesoporous Aluminosilicates Assembled from a Triblock Copolymer and Preformed Aluminosilicate Precursors in Strongly Acidic Media", Chemistry of Materials, vol. 14, No. 3, 2002, pp. 1144-1148.

Mokaya, R. "Al Content Dependent Hydrothermal Stability of Directly Synthesized Aluminosilicate MCM-41", Journal of Physical Chemistry B., vol. 104, No. 34, 2000, pp. 8279-8286.

Lewis, Hawley's Condensed Chemical Dictionary (14th Edition), John Wiley & Sons, pp. 1-2, Sep. 4, 2003.

Tuel, "Crystallization of Titanium Silicate-1 from Gels Containing Hexanediamine and Tetrapropylammonium Bromide," Progress in Zeolite and Microporous Materials, Studies in Surface Science and Catalysis, vol. 105, pp. 261-268, 1997.

Iler, R. K., "The Effect of Surface Aluminosilicate Ions on the Properties of Colloidal Silica", Journal of Colloid and Interface Science, vol. 55, No. 1, Apr. 1976, pp. 25-34.

Iler, R. K., The Chemistry of Silica, John Wiley & Sons, New York, NY, 1979, pp. 710-712.

\* cited by examiner

SILICEOUS MATERIALS HAVING TUNABLE POROSITY AND SURFACE MORPHOLOGY AND METHODS OF SYNTHESIZING SAME

TECHNICAL FIELD

This invention relates generally to a siliceous material having highly tunable pore size and a method of synthesizing the material. More specifically, the invention relates to a siliceous material having highly tunable pore size, pore volume, and surface area.

BACKGROUND

Designing and patterning inorganic materials with porous and complex shape is a central theme in engineered material science. Several routes of "morphosynthesis" and templated, inorganic materials synthesis have been reported. Diverse underlying principles of these routes include, for example, block copolymer mesophases, colloidal arrays, bacterial superstructures, replication via reverse micelles, bicontinuous microemulsions, oil in water droplets, and emulsion foams.

Highly ordered, surfactant templated porous silica structures (e.g., MCM-41) structures consisting of bundles of hexagonally close-packed cylindrical channels are disclosed in "Ordered Mesoporous Molecular Sieves Synthesized by a Liquid Crystal Template Mechanism," by C. T. Kresge et al., Nature 359: 710 (1992). A similar structure with tunable pore diameter and "thicker" pore walls (e.g., SBA-15) is disclosed by D. Zhao et al. in "Triblock Copolymer Synthesis of Mesoporous Silica with Periodic 50 to 300 Angstrom Pores," Science 279: 548 (1998). These materials are both based on tetraethylorthosilicate ("TEOS").

It is known that oriented organization of pores may result in higher selectivity with respect to catalytic applications, thus increasing their efficiency, especially in water/steam and high temperature catalytic applications. Such harsh conditions, however, may result in the collapse of the rather thin silica pore walls, minimizing the organization of the pores and reducing pore volume with a concomitant reduction in catalyst activity. To date, MCM-41 and SBA-15 type and similar materials have not been extensively utilized as industrial catalyst or catalyst support materials.

There thus exists an ongoing need for robust siliceous materials having tunable pore structures. Such materials would be particularly beneficial as industrial catalysts and catalyst support materials, heavy metal remediation materials, antibacterial materials, sorbents, pigments, and high temperature air pollution control applications.

SUMMARY

This invention accordingly provides a new, versatile, and economic route to creating porous siliceous materials with tunable pore size, pore volume, and surface area. The motivation for synthesizing such a porous and "robust" silica structure was borne after recognizing the demand for a tunable porous catalyst support material with high pore volume and rigid pore structure. The tunable porosity characteristics of the material of the invention offer a flexible solution, in terms of pore diameter, pore volume, and surface area range, in a siliceous matrix not previously available. Tunability is achieved by exploiting a range of additives and changes in process parameters to influence pore formation during particle formation.

In an aspect, this invention includes non-spherical siliceous particles having a plurality of randomly oriented branches. The branches are elongated, ring-like, and/or aggregated. Each branch includes a plurality of pores and pore types, where the pores have a tunable pore volume controlled by an additive introduced during synthesis of the particle. In different embodiments, the pores have an inner diameter ranging from about 2 Å to about 50,000 Å.

In another aspect, the invention includes a method of synthesizing the disclosed non-spherical siliceous particles. The method includes mixing an aqueous silicic acid solution with an acidic heel solution in a reaction vessel. Such mixing occurs with constant or intermittent stirring with an optionally variable speed. To induce siliceous particle precipitation by imposing a pH change from a lower pH to a higher pH an additive is introduced at a controlled rate. One or more solutions containing a salt of a metal may be optionally introduced into the mixture to create metal-doped particles. Additionally, at least a portion of the inner body, an outer surface located outside of the pores, and/or at least a portion of an inner surface located inside of the pores may optionally be modified.

It is an advantage of the invention to provide robust siliceous particles having tunable pore size and volume and methods of producing such particles.

It is another advantage of the invention to provide novel siliceous particles for industrial catalyst support applications.

A further advantage of the invention is to provide a novel siliceous material for separation technology applications such as heavy metal contaminated wastewater.

It is yet another advantage of the invention to provide novel siliceous materials having tunable surface areas that are easily functionalized with various moieties.

Additional features and advantages are described herein, and will be apparent from, the following Detailed Description, Figures, and Examples.

DETAILED DESCRIPTION

In developing this invention, a consistent effort was undertaken to synthesize porous siliceous particles with morphology different from discrete spherical silica particles. In contrast to spherical colloidal silica particles, which achieve porosity upon drying and rearrangement of the spheres, the process of precipitating silicic acid via controlled pH change introduces porosity in the "worm-like" siliceous particles of the present invention. By choosing the initial pH typically below the point of zero charge ("PZC") of silica and introducing an additive (e.g., ions or organic templates) to modify the growth of the precipitated particles, the surface area, morphology, and porosity become tunable. Some additives added to the acid sol during synthesis are typically effective at extremely low pH levels, such as 0 to 5, where the polymerization reaction is catalyzed with the rate being proportional to the concentration, addition rate, etc. of additive. Doping metals such as aluminum (and, for example, to a lesser extent iron) tend to offset the effect of some additives by forming complexes with the doping metal and retard polymerization in this pH range.

Figure 1:
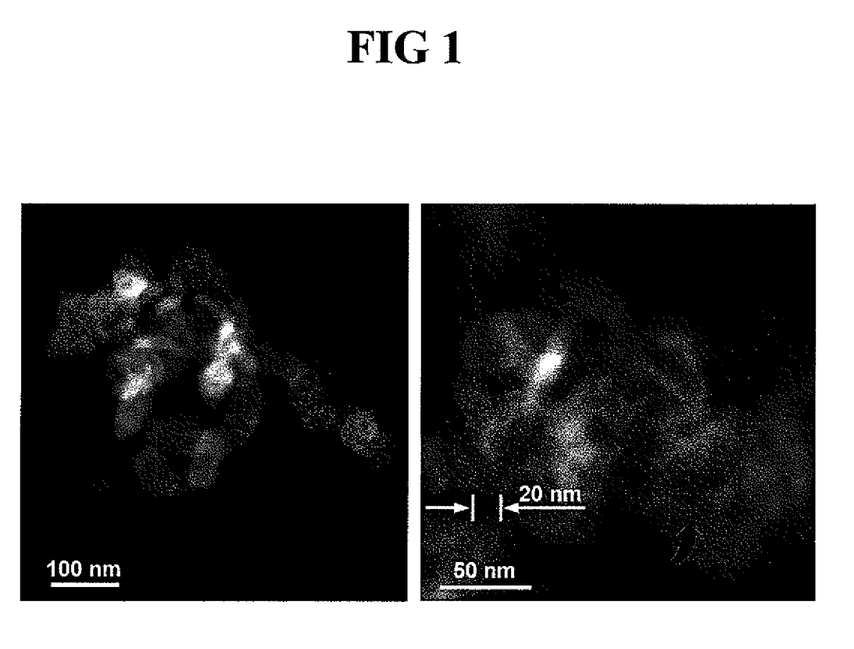
FIG. 1 shows high-resolution STEM images of the "worm-like" siliceous material of the invention, revealing material-typical branched silica morphology having pits, crevices, and interconnected pores (arrows).

In one embodiment, the invention includes "undoped" worm-like or elongated siliceous materials. The materials typically have multiple branches, which have an outer diameter ranging from about 3 nm to about 120 nm, as illustrated in FIG. 1. Under certain circumstances, the branches may have a smaller outer diameter range, for example from about 20 nm to about 70 nm.

The branches generally grow in no particular direction and may form either a more elongated particle or may curl up into ring-type structures. Aggregation, such as isotropic aggregation, is also possible and may be due to the preferential attachment of small silica particles at the ends of a floc where the repulsion energy barrier is at a minimum. Not wishing to be bound to a particular theory, one theory is that directional charged particles present less of an electrical potential barrier for particle addition than the sides (See I. L. Thomas and K. H. McCorkle, "Theory of Oriented Flocculation," J. Colloid Interface Sci., 36: 110 to 118, 1971). In some embodiments, pits and crevices (sometimes numerous) with varying shape cover the surface of the branches thus increasing the total surface area. Pores may alternatively be unconnected or interconnected. Although the reaction may be carried out at any suitable temperature, preferably it is carried out at room temperature. Since the reaction is typically exothermic, the temperature in the reaction vessel may be controlled by, for example, circulating cooling water flushing through a double walled reactor to keep the reaction at the desired temperature.

Figure 2:
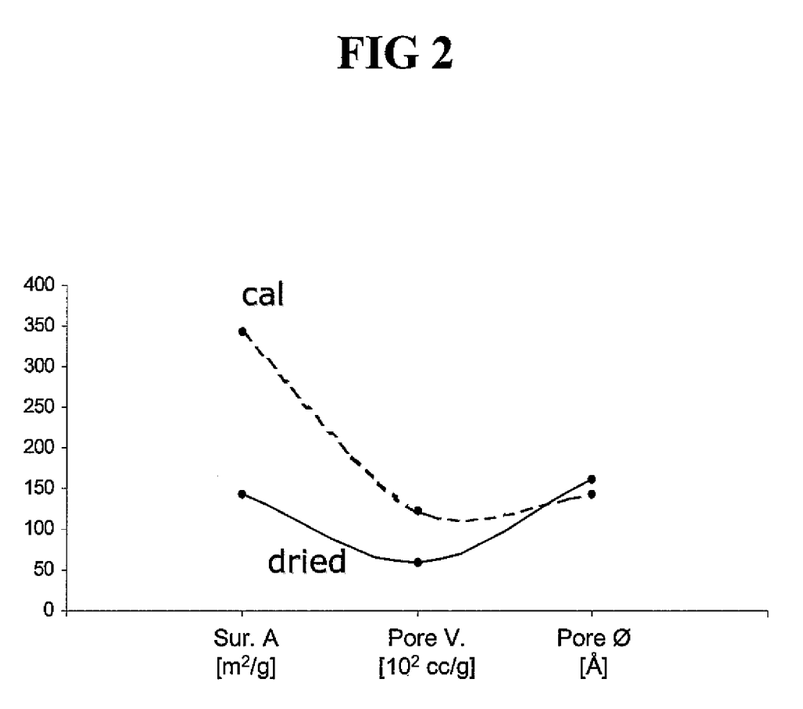
FIG. 2 illustrates the effect of calcination on the nitrogen gas adsorption of porous, templated siliceous materials of the invention.

In an embodiment, an additive is introduced during the synthesis of the siliceous material of the invention to create porosity, create a certain structure, as a template or templating agent, or as a structure director. Drying and calcining also have a major effect on final particle morphology with regard to pore characteristics. Such additives are generally inorganic bases, organic bases, organic acids, fluoride ion sources, surfactants, and combinations thereof. For example, the template effect of carboxylic acid in worm-type silica is demonstrated in the graph of FIG. 2. The sample (as explained in Example 5) was synthesized using a citric acid—ammonia complex, which was included within the silica matrix. The sample dried at 150° C. exhibited moderate surface area and pore volume indicating that the template was still present within the pores. After calcination at 600° C. for two hours, the silica material was template free. The surface area of the calcined material increased significantly, while the pore volume doubled and the pore diameter dropped a small amount.

Figure 3:
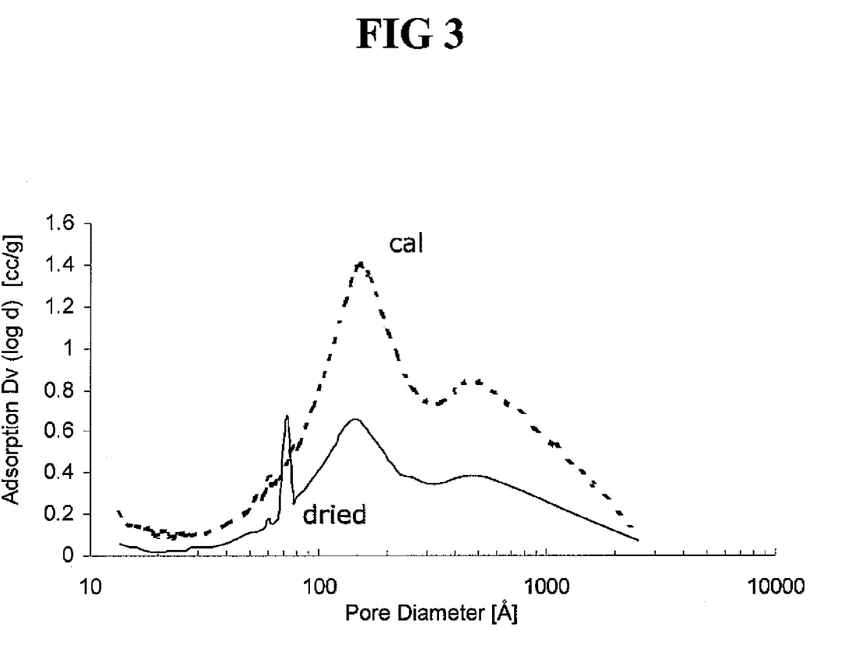
FIG. 3 is a graph illustrating the effect of calcination on the pore volume of templated silica.
Figure 4:
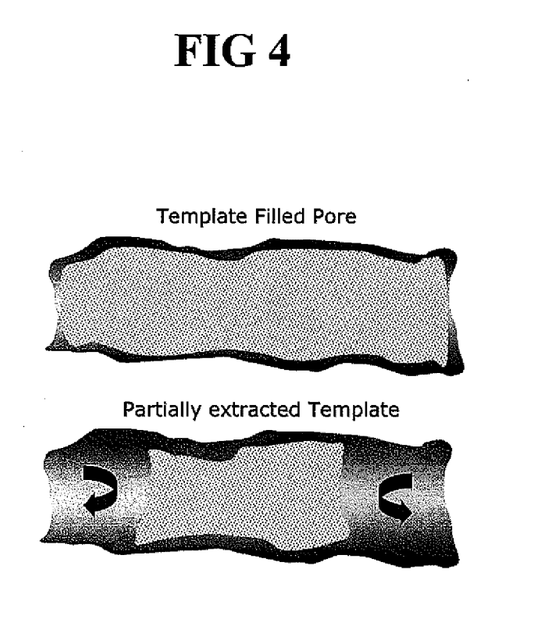
FIG. 4 is a schematic illustrating the effect of in situ template extraction on the pore volume of templated silica.

FIG. 3 shows the Barret-Joyner-Hallenda (BJH) adsorption plot of a sample (as explained in Example 5). The pore diameter of the two considered materials was plotted as a function of the nitrogen adsorption parameter. Interestingly, the peaks of both materials essentially overlapped. It can be seen that the porosity curves in FIG. 3 overlap quite accurately and the dried sample contains a large amount of porosity, indicating that porosity may be created by decomposing the ammonium citrate complex at low pH conditions before drying and calcination. Though other scenarios are possible, a potential scenario for this process is illustrated in the schematic in FIG. 4. Silica condenses along the ammonium citrate crystal coating the template. Since the pH conditions are still very low, the ammonium citrate complex may be partially extracted in situ during the synthesis (i.e., under acidic conditions void space may be left behind creating porosity).

Synthesis of the worm-like siliceous material of the invention may be modified using various templates to adjust porosity in terms of pore diameter and pore volume, which both directly influence surface area. Typically, unmodified precipitated silica reflects pore size in the range of about 100 nm to about 200 nm. Part of the development of worm-like silica focused on the modification of pore diameter, pore volume, and surface area. Adsorption characteristics change with pore size and hence porosity may be classified as, for example, submicro-, micro-, meso-, and macroporosity. Such terms for porosity may be defined generally as follows with regard to diameter: submicropores are below 1 Å; micropores are up to about 20 Å; mesopores range from about 20 Å to about 500 Å; and macropores are greater than about 500 Å.

Figure 5:
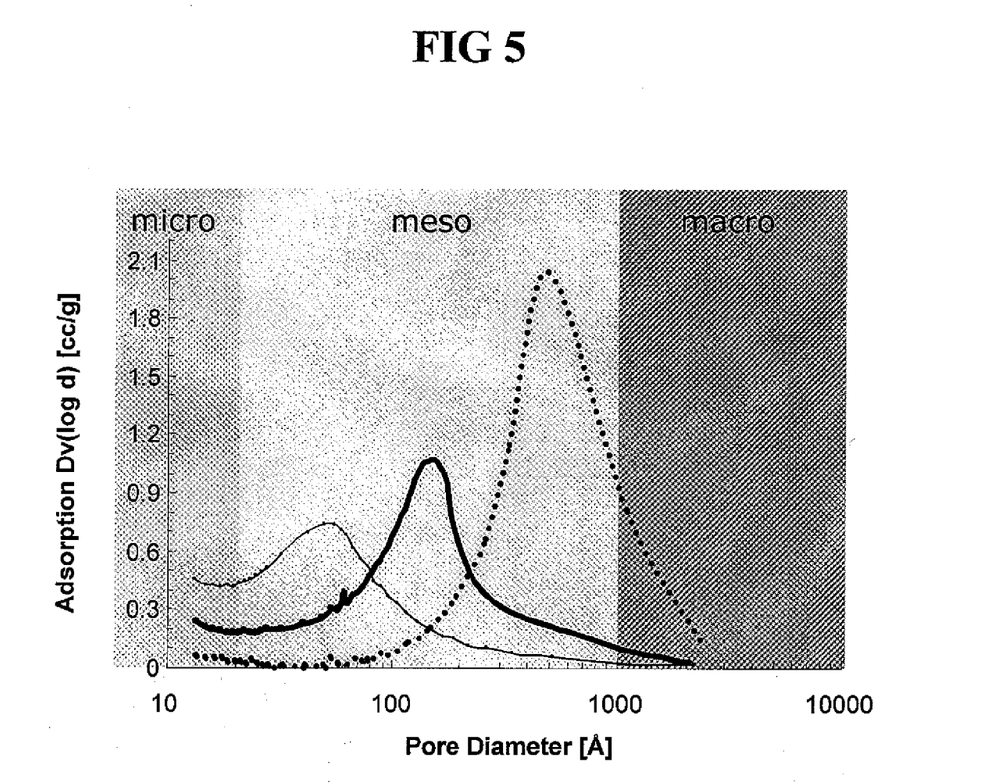
FIG. 5 illustrates the tunability with respect to porosity of the siliceous material of the invention in the range of micro-, meso-, and macroporosity confirmed by nitrogen gas adsorption.

As exemplified in the graph in FIG. 5, the range of porosity spans a large range of pore diameters. The light line represents an ammonium citrate templated sample, where the reaction conditions were kept at the lower acidic end. The porosity achieved was a high volume microporosity with additional porosity in the mesoporous range. The sample represented by the bold line followed a similar synthesis set-up but the amount of ammonium citrate added was six-fold greater and shifted the porosity range into a high pore volume mesoporous material. The highest pore volume was achieved in the sample represented by the dotted line (synthesis explained in Example 4), which contained no ammonium citrate; instead, it contained ions to modify the polycondensation and gelation process of silicic acid. As can bee seen in FIG. 5, the porosity range changes to the upper mesoporous/lower macroporous range with a concomitant increase in the pore volume.

Figure 6:
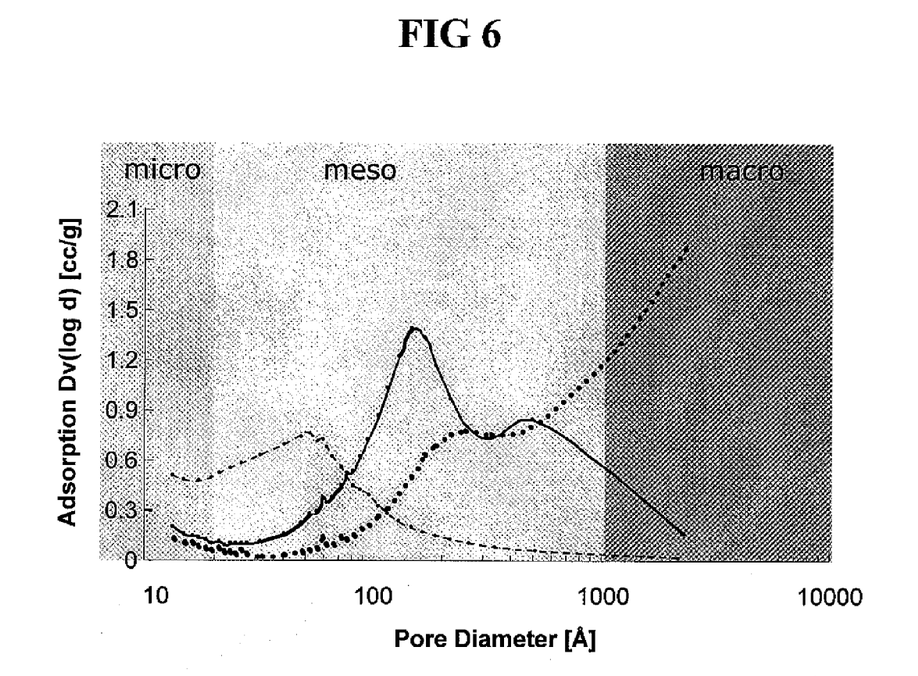
FIG. 6 shows an example of a possible bi-modal pore structure in various porosity ranges.

In alternative embodiments, the versatility of the material can be further stretched in creating bi-modal, porous silica. FIG. 6 shows three such samples with different porosity values. The sample represented by the dashed line (synthesis discussed in Example 6) was synthesized using ammonium citrate templates at very low pH. That material exhibited micro- and mesoporosity. The reaction conditions for the sample shown by the solid line was modified with respect to the pH range by starting the reaction at low pH and forcing gelation at pH 6 and above. For the sample represented by the dotted line (synthesis discussed in Example 2), ammonium citrate was added starting at an initial pH of 1 with its final pH being pH 11.

Further flexibility in terms of porosity ranges has been given by the addition of various carboxylic acids and organic materials employed as templates or additives. These additives provide a means to create pores of desired size and/or structure. Variation in ion addition changes reaction conditions with respect to amount of gelation occurring and porosity created. Representative additives include fluoride ion sources, such as NaF, LiF, KF, and the like; organic fluoride ion sources, such as vinyl fluoride and ethylene fluoride polymers; organic bases including organic acids, such as citric acid, oxalic acid, succinic acid, tartaric acid, acetic acid, and the like; combinations of organic acids and organic bases; polymers, such as polyethylene glycol; surfactants; the like; and combinations thereof.

In another embodiment, the siliceous material of the invention includes silica particles doped with metal. Representative dopants include solutions containing metal salts including salts of palladium, silver, platinum, nickel cerium, cobalt, copper, iron, molybdenum, chrome, vanadium, titanium, tin, zinc, and aluminum; other suitable solutions; the like; and their combinations. Doping the silica source with various metal sources changes reaction conditions and kinetics/thermodynamics. Consequently, porosity may also be altered, thus providing an alternative mechanism for tuning porosity characteristics. In the following, conditions and properties of worm-like silica doped with metals such as aluminum, palladium, titanium, and zinc as well as the combinations thereof are discussed. It should be appreciated that the class of potential metals for doping is broad, with representative examples being transition metals, heavy metals, noble metals, rare earth metals, and their combinations.

Several ways of doping worm-like silica were explored in the development of this invention. Metal salts were added to cooled silicic acid with a specific gravity of up to about 1.044 g/ml keeping the pH at or below about pH 3.5. Generally, the specific gravity of such silicic acid ranges from about 1.03 to about 1.05 g/ml, or more broadly from about 0.8 to about 1.31 grams/ml. STEM and EDS experiments were performed to validate the distribution of the doping metal in the silica matrix. A homogeneous distribution of the metals such as aluminum in the silica matrix can be achieved under the correct reaction set-up. Metals such as palladium, zinc, and the like were, in contrast, heterogeneously incorporated into the matrix. The heterogeneous nature of the catalyst typically occurs due to cluster formation on the surface and throughout the silica matrix. Secondary and tertiary metals are usually not included in the metal nanoclusters. The cluster may have a size ranging from sub-nm to about 50 nm, with smaller clusters being more desirable.

Metals are typically added as metal salts and are occluded in the silica matrix by incipient wetness or other suitable impregnation techniques. Upon reduction by hydrogen or other reducing agent, the metal ions become metallic in nature. For example, chloroplatanic acid includes platinum in the $Pt^{2+}$ oxidation state. Exposure to a reducing agent reduces the platinum ion to the $Pt^{3+}$ state.

An issue that may occur during metal doping and further processing and application is migration and subsequent sintering of the metal(s). In many catalysis applications, the metal clusters should be as small as possible to maximize metallic surface area. The metal clusters, as observed using STEM, are generally in the range of less than 1 nm to about 10 nm. Designing a well functioning doped siliceous material catalyst typically entails finding the ideal relationship between robust immobilization of the catalytic metal onto the support material to prevent surface migration (and sintering) of small clusters and in parallel, the availability of the metal as active sites to catalyze the intended reaction.

In alternative embodiments, the versatility of the material can be further stretched in creating bi-modal, porous silica. FIG. 6 shows three such samples with different porosity values. The sample represented by the dashed line (synthesis discussed in Example 6) was synthesized using ammonium citrate templates at very low pH. That material exhibited micro- and mesoporosity. The reaction conditions for the sample shown by the solid line was modified with respect to the pH range by starting the reaction at low pH and forcing precipitation at pH 6 and above. For the sample represented by the dotted line (synthesis discussed in Example 2), ammonium citrate was added starting at an initial pH of 1 with its final pH being pH 11.

Figure 7:
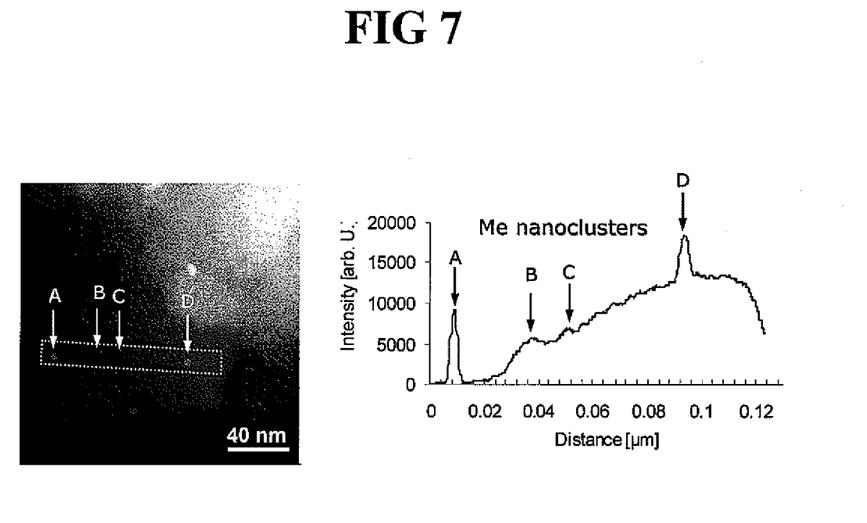
FIG. 7 shows a Z-contrast image and related intensity profile accentuating metal nanoclusters.
Figure 8:
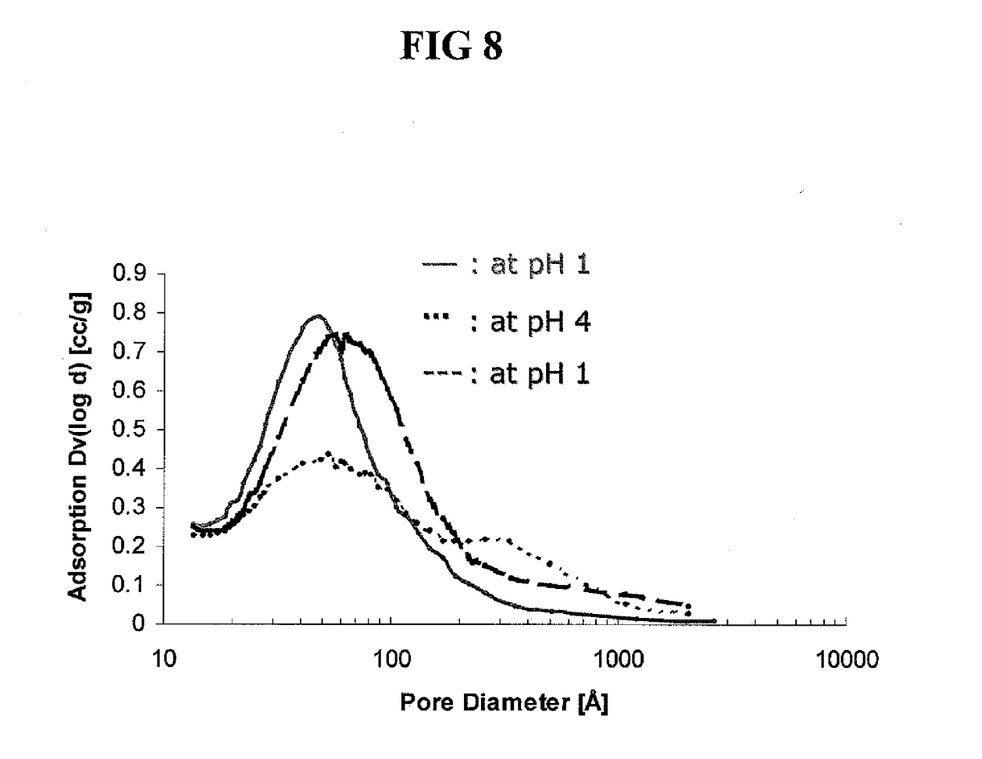
FIG. 8 is a graph illustrating the change in porosity of aluminum doped silica under various pH conditions.

In an embodiment, immobilization of palladium nanoclusters on a silica-based support was achieved by doping titania-silica composite with a palladium salt in solution subsequent to the synthesis. Homogeneous distribution of the titania in the silica matrix was observed, while nano-clusters of the palladium was detected. The distribution of both metals may be within and/or without the pores structure. Through EDS elemental mapping, such "palladium islands" were found on the surface of the titania-silica material as well as within the porous titania-silica matrix. Typically, the clusters generally vary in size from about 2 nm to about 20 nm. The elemental maps of Si, O, and Ti overlapped and resembled the same shape of the particle indicating a homogeneous distribution of the titania within the silica matrix. The presence of palladium nanoclusters was verified via STEM imaging and computed intensity profiles as seen in FIG. 7. The intensity profile relates directly to the Z-contrast image. As the palladium nanoclusters in points A and D are seen in the image, the clusters at points B and C are located in the sub-matrix of the material below the surface and are not apparent in the image. It should be appreciated that though palladium was discussed in this embodiment, any of the metals described herein or their combinations are suitable.

In an alternative embodiment, the needs of a different catalyst market may be addressed with a siliceous material doped with aluminum to generate an acidic porous catalyst. Preferably, the metal must be embedded within the silica network on the atomic scale to act as a favorable acid catalyst providing an ideal level of acidity and requisite number of active sites. Therefore, the interaction mode of the template and the metal/metal oxide/silicate during the synthesis of the worm-like silica is of importance.

Figure 9:
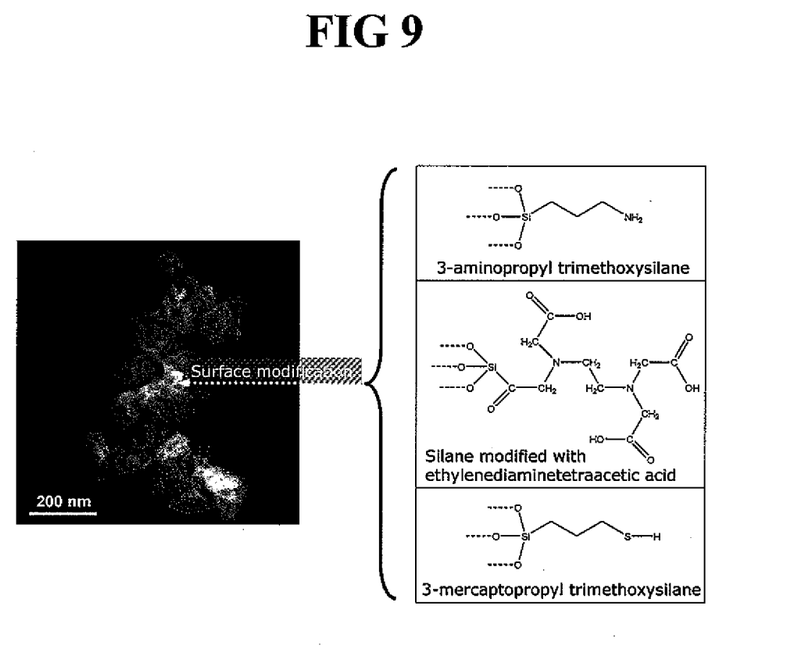
FIG. 9 is an STEM image and schematic showing examples for silane chemistries to surface modify worm-like siliceous materials.

According to another embodiment, aluminum doping of worm-like silica was achieved at low pH without using a carboxylic acid based template. As seen in FIG. 9, the porosity changed according to the synthesis parameters (i.e., pH of the reaction). The samples studied in this embodiment were synthesized according to Example 8—$Al_2O_3$—$SiO_2$. Under certain conditions, it was observed that higher pore volume was generally attained at lower pH conditions. The porosity of this material was observed to be between about 30 Å and about 200 Å, with a peak centered around 50±10 Å.

Under certain conditions, doping the silicic acid with one or more metals, such as aluminum, zinc, and palladium, before the synthesis of worm-like silica changes kinetics/thermodynamics and condensation conditions, typically resulting in a decrease in porosity. The addition of titanium should be mentioned as an exception. If titanium is added at low pH to silicic acid, for example as titanium sulfate, the titania salt by itself will precipitate at alkaline pH generating additional porosity. In an embodiment, zinc may be doped into the matrix by addition of zinc nitrate into silicic acid. Zinc can be immobilized on the surface of worm-like silica without reducing activity of the catalyst and produce an economical recyclable catalyst or antibacterial material.

Figure 10:
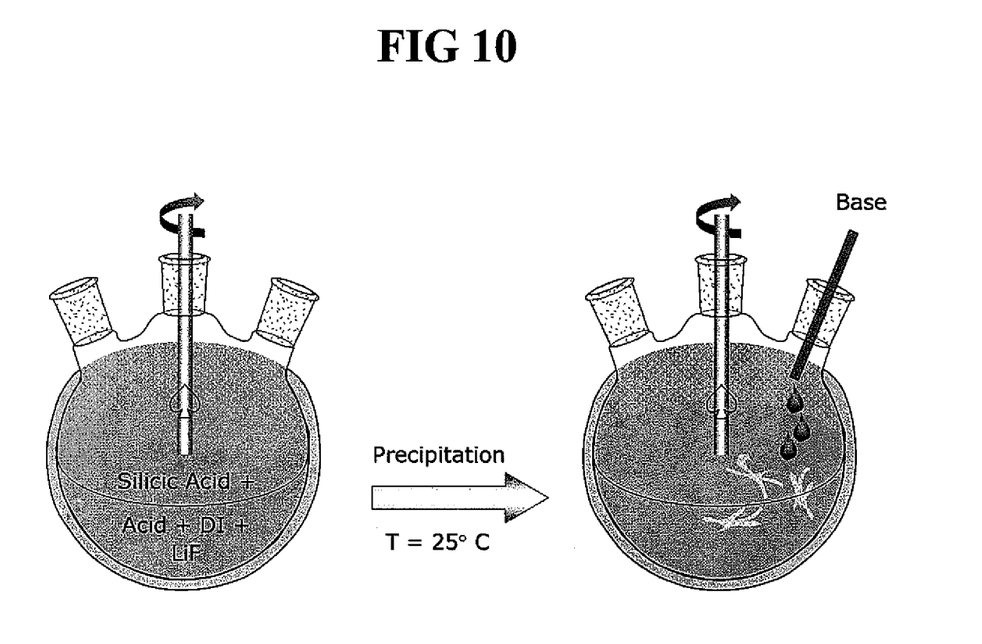
FIG. 10 is a schematic illustrating the reaction vessel setup for synthesizing the worm-like siliceous material of the invention.

In a further embodiment, the surface of the siliceous material of the invention may be modified. Representative surface-modifying agents include silanes, silanols, metal organic compounds, metals, metal oxides, polymers, fluorescent moieties, the like, and their combinations. Heavy metal removal from wastewater is a potential application for such surface-modified worm-like siliceous materials. For example, thiol groups were placed on the surface of worm-like silica via silanol modification, which were added to the reaction after the worm-like silica reaction was completed. The examined wastewater contained 130 mg/liter Cu and 140 mg/liter Mn at pH 3. A sample prepared with a reaction apparatus as depicted in FIG. 10 was tested for copper removal and was found to remove about 75% of the copper in the system.

In an embodiment, silica modified with EDTA during the silicic acid preparation step was tested and shown to remove about 98% of the copper. Considering the porosity of the material, a surface modification using, for example, silanol groups decreased pore volume and surface area of the sample by about 50%. FIG. 13 shows an STEM image of a porous silica particle and examples of silane chemistries that were employed to modify surface properties of the worm-like silica.

Moreover, in a preferred embodiment, the siliceous materials of the invention may be synthesized without the use of surfactants as additive. The use of surfactants in materials synthesis of this kind may be economically reasonable under certain circumstances. For example, if the surfactant may effortlessly be removed from the pores and in turn be recycled and reused for subsequent syntheses.

The foregoing may be better understood by reference to the following examples, which are intended for illustrative purposes and are not intended to limit the scope of the invention.

General Synthesis, Preparation, and Analysis

Brunauer, Emmett, and Teller (BET) sample preparation included degassing for about 1 to 4 hrs (and ranging up to about 24 hrs) at up to about 300° C. Such degassing (and drying) may be performed at a temperature ranging from about room temperature to about 300° C. Nitrogen physisorption measurements were carried out using an Autosorb-1C Instrument (Quantachrome Instruments in Boynton Beach, Fla.). The data for the below examples includes multi-point BET surface area, pore volume, and BJH adsorption pore size distribution.

Analytical electron microscopy (AEM) characterization was performed on calcined samples. Calcination typically was carried out from about 300° C. to about 1,200° C. for a period of about 2 hrs. Selected samples were prepared using a holey carbon film coated Cu TEM grid. A small amount of the calcined powder was dispersed in deionized water or isopropanol and treated in an ultrasonic bath to increase sample dispersion. One to two drops of the sample were mounted on the TEM grid followed by a drying step at 60° C.

The TEM images were acquired using a JEOL 2010F FasTEM STEM/TEM with a Schottky FEG—source. The microscope was operated at 200 kV. In STEM mode the microscope was capable of producing a probe size of 0.13 nm with 15 pA of current enabling magnifications in excess of 10,000,000×. The microscope was equipped with a standard ultra-high-resolution objective lens pole piece, a JEOL annular dark-field detector, a post-column Gatan imaging filter (GIF), and a Noran Vista EDX system with a light element detector including drift correction. The lens conditions in the microscope were defined for a probe size of 0.2 nm, with a convergence angle of 13 mrad, and a collection angle of 52 mrad. Using these settings, the probe current at 40 pA was sufficient to obtain statistically significant information with the Z-contrast image being incoherent and enabling the acquisition of direct images of the structure.

STEM-XEDS was applied to obtain elemental maps of the material to assess composition. Resolution using this technique was limited to about 1 nm. Elemental maps were obtained by probing the sample a statistically significant number of times and applying the energy window method. The settings were selected carefully since detectability limits may be affected when elemental mapping is conducted for minor amounts of elements (e.g., several atomic %). The quality of STEM-XEDS maps was modified by post experiment image processing. Color saturation adjustment, contrast level separation, and high-pass filtering have been performed in a skillful manner to improve image quality and appearance.

EXAMPLE 1

Worm-like porous siliceous materials were synthesized by preparing silicic acid through cationic ion exchange of 3 wt % to 6.5 wt % solution of chilled sodium silicate. The cation exchange step may be performed through any means of exposing or contacting the silicic acid with the ion exchange resin, for instance mixed in a vessel or through a column. 1130 ml of sodium silicate solution was diluted to 2,600 ml with deionized water. The dilute sodium silicate solution was deionized with a Dowex Monosphere® 650-H resin (available from Dow Chemical Co. in Midland, Mich.) of acid form into a 1:2 ratio of resin:solution through a column. The resin in the column was first flushed with deionized water and the dilute sodium silicate solution was then passed through the column. When the effluent reached a pH of 3.5 (signifying the presence of silicic acid sol), the effluent was collected. The resulting silicic acid sol had a specific gravity generally in the range of 1.0384 g/ml to 1.0457 g/ml, depending upon the deionized water to silicate ratio. If the sol was doped with a metal source such as aluminum, it was added in the form of aluminum chlorohydrate. If titanium oxide was the desired dopand in the sol, a 15 wt % solution of $Ti(SO_4)_2$ was added to the sol.

The reaction setup is illustrated in FIG. 10. The depicted laboratory reactor included a 5-liter, double walled, triple necked round bottom flask. To remove any residue or contaminants from the walls of the flask, the reactor was soaked in 0.5 N caustic soda, and rinsed to neutrality with deionized water. The flask was stirred with standard, uncalibrated lightening mixers. A thermocouple was passed through a neck while one opposing neck housed an addition hose. A solution of deionized water and HCl was added to the flask under stirring at 300 rpm to keep the pH below 2. The previously prepared doped/undoped acid sol was added to the flask. Structural modifiers may be added at this point.

In order to induce silica precipitation, adding a doped or undoped ammonia solution at various feed rates imposed a confined pH change of the silica heel. Doping of ammonia may also include hydroxyl-carboxylic acids. Since the reaction occurring in the flask was exothermic, the flask was cooled using tap water running through the double walls of the flask to keep the reaction temperature at room temperature. During the addition of the ammonia solution, the pH may rise above pH 4 and HCl may be introduced to the reaction to lower the pH, if desired. Subsequent metal doping was performed by adding, for instance, a mixture of sodium tetrachloropalladate and deionized water using a peristaltic pump at a predefined rate from a reservoir. In some reactions, the pH changed gradually to higher pH values, up to a final pH of 10.5. To obtain the final product, the samples were dried overnight at temperatures ranging from 65° C. to 150° C., followed by a calcination process at 500° C. to 600° C. for 2 hrs.

The following Examples describe a selection of synthesized "worm-like" siliceous materials, which include the modification of a silica matrix using various fluoride ions and organic acids. In addition, these Examples describe the doping of metal oxides into the silica matrix as well as metal doping of metal oxide doped silica via incipient wetting.

EXAMPLE 2

Silicic acid was prepared by cationic exchange of approximately 6.5 wt % solution of chilled sodium silicate, prepared by diluting 600 ml of sodium silicate solution to 4 liters with deionized water. The dilute sodium silicate solution was deionized with a Dowex Monosphere® 650-H resin (available from Dow Chemical Co. in Midland, Mich.) of acid form into a 1:2 ratio of resin:solution through a column. The resin in the column was first flushed with deionized water and the diluted sodium silicate solution was then passed through the column. As soon as the effluent became acidic, signifying the presence of silicic acid, the effluent was collected.

Six ml of deionized water was added to a reaction flask at room temperature and 2 ml of HCl was added to the heel. In addition, the heel was charged 18.8 g of acid sol (specific gravity: 1.0443) and was constantly stirred at 300 rpm. An ammonia solution was prepared, including 36 g of a 28% NH4OH solution having 0.54 g of dissolved citric acid monohydrate. In order to induce silica precipitation, the ammonia solution was added to the heel at a feed rate of 0.12 ml/min. Increasing stirring to 800 rpm broke up unwanted gelation. The final sample was held under reflux for 2 hrs with a pH of 11.5. Physisorption data indicated a surface area of 186 m$^2$/g, a pore volume of 1.65 cc/g, and a pore diameter of 353.8 Å.

EXAMPLE 3

Six ml of deionized water was added to a reaction flask at room temperature and 2 ml of HCl was added to the heel. The heel was charged with 18.8 g of acid sol (specific gravity: 1.0455) and 0.01 mol NaF was added. The heel was kept stirred at 300 rpm. An ammonia solution was prepared, including 9 g of a 28% NH4OH solution and 0.1 g of dissolved citric acid monohydrate. In order to induce silica precipitation, the ammonia solution was added to the heel at a feed rate of 13.8 ml/2 hrs. The final sample was a gel at pH 5. Physisorption data indicated a surface area of 128.8 m$^2$/g, a pore volume of 1.73 cc/g and a pore diameter of 536.3 Å.

EXAMPLE 4

Two ml of HCl was added to a reaction flask at room temperature containing 6 ml deionized water. The heel was charged with 18.8 g of acid sol (specific gravity 1.0426) and 0.01 mol NaF was added. The heel was kept stirred at 500 rpm. An ammonia solution was prepared, which include 9 g of a 28% NH$_4$OH. In order to induce silica precipitation, the ammonia solution was added to the heel at a feed rate of 13.8 ml/2 hrs. The final sample was a gel at pH 5. Physisorption data indicated a surface area of 119.5 m$^2$/g, a pore volume of 1.1 ml/g and a pore diameter of 368.4 Å.

EXAMPLE 5

222.2 ml of HCl was added to a reaction flask at room temperature containing 666.6 ml of deionized water. The heel was charged with 2,000 g of acid sol (specific gravity 1.0457), and was constantly stirred at 450 rpm. An ammonia solution was prepared, which included 295.6 grams of a 28% NH$_4$OH and 4.4 g of citric acid monohydrate. In order to induce silica precipitation, the ammonia solution was added to the heel at various feed rates with 240 ml at 240 ml/hr and 60 ml at 960 ml/hr. The pH was monitored during the reaction and was adjusted back to pH 1 with 100 ml HCl after reaching pH 7. The final sample pH was 1. The final product was oven dried at 150° C. for 3.5 hrs ("dried" curve in FIG. 2), followed by milling and calcination of the powder at 600° C. for 2 hrs ("cal" curve in FIG. 2). Physisorption data indicated a surface area of 344.2 m$^2$/g, a pore volume of 1.24 ml/g, and a pore diameter of 143.5 Å.

EXAMPLE 6

111 ml of HCl was added to a reaction flask at room temperature containing 333.3 ml of deionized water and the heel was charged with 1,000 g of acid sol (specific gravity 1.0392). The heel was kept stirred at 230 rpm. An ammonia solution was prepared, including 147.8 g of a 28% NH$_4$OH and 2.2 g of citric acid monohydrate. To induce silica precipitation, the ammonia solution was added at various feed rates with 120 ml at 120 ml/hr and 30 ml at 960 ml/hr to the heel. The pH was monitored during the reaction and was adjusted from pH 2 to pH 1 with 25 ml HCl after ¾ of the ammonia solution was fed. The final sample pH was 1. Gelling was decreased during this reaction. The product was oven dried at 150° C. for 2 hrs, followed by milling and calcination of the powder at 600° C. for 2 hrs. Physisorption data indicated a surface area of 636.8 m$^2$/g, a pore volume of 0.643 ml/g, and a pore diameter of 40.39 Å.

EXAMPLE 7

111.1 ml of HCl was added to a reaction flask at room temperature containing 333.3 ml of deionized water and the heel was charged with 1,000 grams of acid sol (specific gravity 1.0396). The heel was kept stirred at 330 rpm. An ammonia solution having 147.8 g of a 28% NH4OH and 6.6 g of citric acid monohydrate was prepared. In order to induce silica precipitation, the ammonia solution was fed to the heel at a rate of 200 ml/hr. The pH was monitored during the reaction and was adjusted from pH 2 to pH 1 with 25 ml HCl after ¾ of the ammonia solution was fed. The final sample pH was 1. Gelling was decreased during this reaction. The final product was achieved by oven drying at 150° C. for 2 hrs, followed by milling and calcination of the powder at 600° C. for 2 hrs. Physisorption data indicated a surface area of 307.1 m$^2$/g, a pore volume of 0.977 ml/g, and a pore diameter of 127.3 Å.

EXAMPLE 8

111.1 ml of H$_2$SO$_4$ was added to a reaction flask at room temperature containing 333.3 ml of deionized water. 117.92 g of Al(NO$_3$)$_3$ was dissolved in 117.9 ml deionized water and added to 1,000 g of acid sol (specific gravity 1.0263), which was then charged to the heel. The heel was kept stirred at 230 rpm. An ammonia solution was prepared, which included 150 g of a 28% NH$_4$OH and 8.8 g of citric acid monohydrate. In order to induce silica precipitation, the ammonia solution was added to the heel at 120 ml/hr. Decreased gelling was observed during this reaction. The product was oven dried at 150° C. for 2 hrs, followed by milling and calcination of the powder at 600° C. for 2 hrs. Physisorption data indicated a surface area of 476.4 m$^2$/g, a pore volume of 0.546 ml/g, and a pore diameter of 45.86 Å.

EXAMPLE 9

253 g of HCl was added to a reaction flask at room temperature containing 763.25 ml of deionized water. 7.51 g of Al$_2$(OH)Cl$_5$ was dissolved in 70 ml deionized water having 210.75 g acid sol (specific gravity 1.0384 g/ml). This solution was added to 2,300 g of acid sol (specific gravity 1.0384 g/ml) and charged to the heel. The heel was kept stirred at 450 rpm. An ammonia solution was prepared, which included 710 g of a 28% NH$_4$OH and 43.5 grams of citric acid monohydrate. To induce silica precipitation, the ammonia solution was added at 320 ml/hr to the heel. Increased gelling was observed during the reaction, which was disrupted by increasing stirring to 700 rpm. This product was doped with a Pd-solution (5.8 g $Na_2PdCl_4$ diluted in 58 ml DI), by adding the Pd-solution to the precipitated gel after 30 min of reflux. The product was achieved by oven drying at 150° C. for 3 hrs, followed by milling and calcination of the powder at 600° C. for 2 hrs. Physisorption data indicated a surface area of 286.1 $m^2/g$, a pore volume of 0.952 ml/g, and a pore diameter of 133.1 Å.

EXAMPLE 10

131.3 g of HCl was added to a reaction flask containing 333.3 ml of deionized water at room temperature. 0.7 g KF dissolved in 17 ml of deionized water was added to 1,000 g acid sol (specific gravity 1.0384 g/ml), which was charged to the heel. The heel was kept stirred at 450 rpm. An ammonia solution was prepared, which included 210.6 g of a 28% $NH_4OH$ and 13.2 g of DL-tartaric acid. To induce silica precipitation, the ammonia solution was added to the heel at 320 ml/hr. The final product was a lower viscosity gel with a final pH of 10, achieved by oven drying at 150° C. for 3 hrs, followed by milling and calcination of the powder at 600° C. for 2 hrs. Physisorption data indicated a surface area of 181.5 $m^2/g$, a pore volume of 1.58 cc/g, and a pore diameter of 348.6 Å.

EXAMPLE 11

393.9 grams of HCl was added to a reaction flask containing 1,000 ml of deionized water at room temperature. 2.1 g KF dissolved in 30 ml of deionized water and was added to 3,000 g acid sol (specific gravity 1.0414). $TiO_2$ doping was performed by adding 5 wt % $Ti(SO_4)_2$, based on silica, 2.9 g HCl, and 23.4 ml deionized water to the acid sol. This solution was to the heel and was kept stirred at 450 rpm for 10 min. An ammonia solution has been prepared, which included 221.2 g of a 28% $NH_4OH$ and 26.4 grams of DL-tartaric acid. To induce silica precipitation, the ammonia solution was added to the heel at 320 ml/hr. The reaction was kept stirring at 315 rpm. This product was doped with a Pd-solution (0.78 g $Na_2PdCl_4$ diluted in 100 ml DI), by adding the Pd-solution to the precipitated gel after 30 min of reflux at a feed rate of 160 ml/hr. This reaction was constantly stirred for 2 hrs at 400 rpm and was pH 1. The final product was achieved by oven drying at 150° C. for 3 hrs, followed by milling and calcination of the powder at 600° C. for 2 hrs. Physisorption data indicated a surface area of 587.5 $m^2/g$, a pore volume of 0.56 ml/g, and a pore diameter of 38.07 Å.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of synthesizing a particle, the method comprising:
    (a) mixing under constant or intermittent stifling in a reaction vessel an aqueous silicic acid solution with an acidic solution to form a mixture, said stirring being optionally variable speed;
    (b) introducing at a controlled rate an additive into the mixture, wherein the additive imposes a confined pH change from a lower pH to a higher pH to the mixture to induce siliceous particle precipitation;
    (c) optionally introducing a solution containing a salt of a metal into the mixture; and
    (d) optionally modifying at least a portion of an outer surface located outside of the pores and/or a at least a portion of an inner surface located inside of the pores;
    thereby creating a particle that is non-spherical and siliceous, the particle further comprising a plurality of branches, each branch being randomly oriented and elongated, ring-like, and/or aggregated; a plurality of pores present in each branch, wherein a subset of the pores are interconnected; a tunable pore volume controlled by an additive introduced during synthesis of said particle; and a pore inner diameter ranging from about 2 Å to about 50,000 Å.

2. The method of claim 1, wherein each branch has an outer diameter from about 3 nm to about 120 nm.

3. The method of claim 1, wherein the tunable pore volume is tunable from about 0.10 cc/gram to about 2.5 cc/gram, based on nitrogen physisorption.

4. The method of claim 1, wherein the additive is selected from the group consisting of: inorganic bases, organic bases, fluoride ion sources, surfactants, and combinations thereof.

5. The method of claim 1, wherein at least a portion of an outer surface located outside of the pores is modified and/or at least a portion of an inner surface located inside of the pores is modified.

6. The method of claim 1, including introducing at the controlled rate the additive using a technique selected from the group consisting of: addition at a constant unchanging rate; drop-wise addition; increasing/decreasing the addition rate in a step-wise fashion; increasing/decreasing the addition rate in a ramped fashion.

7. The method of claim 1, wherein the metal in the solution containing the salt of the metal is selected from the group consisting of: transition metals; heavy metals; noble metals; rare earth metals; and combinations thereof.

8. The method of claim 1, including exposing a solution of sodium silicate in the range of about 0.5 wt % to 13 wt % to an ion exchange resin to prepare the aqueous silicic acid solution.

9. The method of claim 1, wherein the additive is selected from the group consisting of: organic acids, inorganic acids, fluoride ion sources, and combinations thereof.

10. The method of claim 1, including imposing a pH change from an initial pH in the range of about 0 to 1.5 to a raised pH in the range of about 6 to 11.

11. The method of claim 1, including introducing an acid solution into the reaction vessel if the pH rises above an ideal pH.

12. The method of claim 1, wherein the reaction vessel includes a temperature control means.

13. The method of claim 1, including drying the particle at a temperature from room temperature to about 300° C. and/or calcining said particles at a temperature from about 300° C. to about 1,200° C.

* * * * *